(12) United States Patent
Ebert et al.

(10) Patent No.: US 7,654,889 B2
(45) Date of Patent: Feb. 2, 2010

(54) CLIP MACHINE

(75) Inventors: Detlef Ebert, Bad Nauheim (DE); Michael Hummel, Raunheim (DE)

(73) Assignee: Poly-Clip System GmbH & Co. KG (DE)

( * ) Notice: Subject to any disclaimer, the term of this patent is extended or adjusted under 35 U.S.C. 154(b) by 0 days.

(21) Appl. No.: 11/837,106

(22) Filed: Aug. 10, 2007

(65) Prior Publication Data

US 2008/0085668 A1  Apr. 10, 2008

(30) Foreign Application Priority Data

Oct. 8, 2006  (DE) .................. 20 2006 012 324 U

(51) Int. Cl.
 *A22C 11/12* (2006.01)
(52) U.S. Cl. ....................................... 452/48
(58) Field of Classification Search ................ 53/138.4, 53/138.3, 138.2, 52, 417; 100/30; 29/753, 29/755, 243.56; 452/46, 48
See application file for complete search history.

(56) References Cited

U.S. PATENT DOCUMENTS

| | | | |
|---|---|---|---|
| 3,377,692 A | 4/1968 | Tipper | |
| 4,255,833 A * | 3/1981 | Niedecker | 452/51 |
| 4,796,332 A | 1/1989 | Stanley | |
| 4,949,428 A * | 8/1990 | Simon | 24/30.5 R |
| 5,425,667 A * | 6/1995 | Hagedorn et al. | 452/48 |
| 5,497,645 A * | 3/1996 | Niedecker | 72/330 |
| 6,101,785 A | 8/2000 | Bienert et al. | |
| 6,524,178 B1 | 2/2003 | Fässler et al. | |
| 6,582,290 B2 * | 6/2003 | Hihnala et al. | 452/50 |
| 6,675,554 B1 * | 1/2004 | Hanten et al. | 53/138.4 |
| 6,871,474 B2 | 3/2005 | Töpfer | |
| 2005/0274088 A1 | 12/2005 | Griggs et al. | |

* cited by examiner

*Primary Examiner*—Thomas Price
(74) *Attorney, Agent, or Firm*—Hahn Loeser & Parks LLP; Michael H. Minns

(57) ABSTRACT

A clip machine for dividing and sealing tubular-shaped packaging filled with stuffing having at least two axially spaced pairs of radially opposed displacement elements, relating to the axis of the packaging tube, which are linked to and equipped with a linear guide, to be compressed radially towards one another and then separated axially in pairs, for the local constriction of the filled packaging and the formation of a tubular braid radially-linearly, and a pivotably arranged first sealing tool and a second sealing tool, with the first and second sealing tools being equipped to set and close at least one clamp fastener around the formed tubular braid, to be compressed radially between the axially separated displacement element pairs, the radial movement direction of displacement element pairs coincides with the radial movement direction of sealing tools.

9 Claims, 4 Drawing Sheets

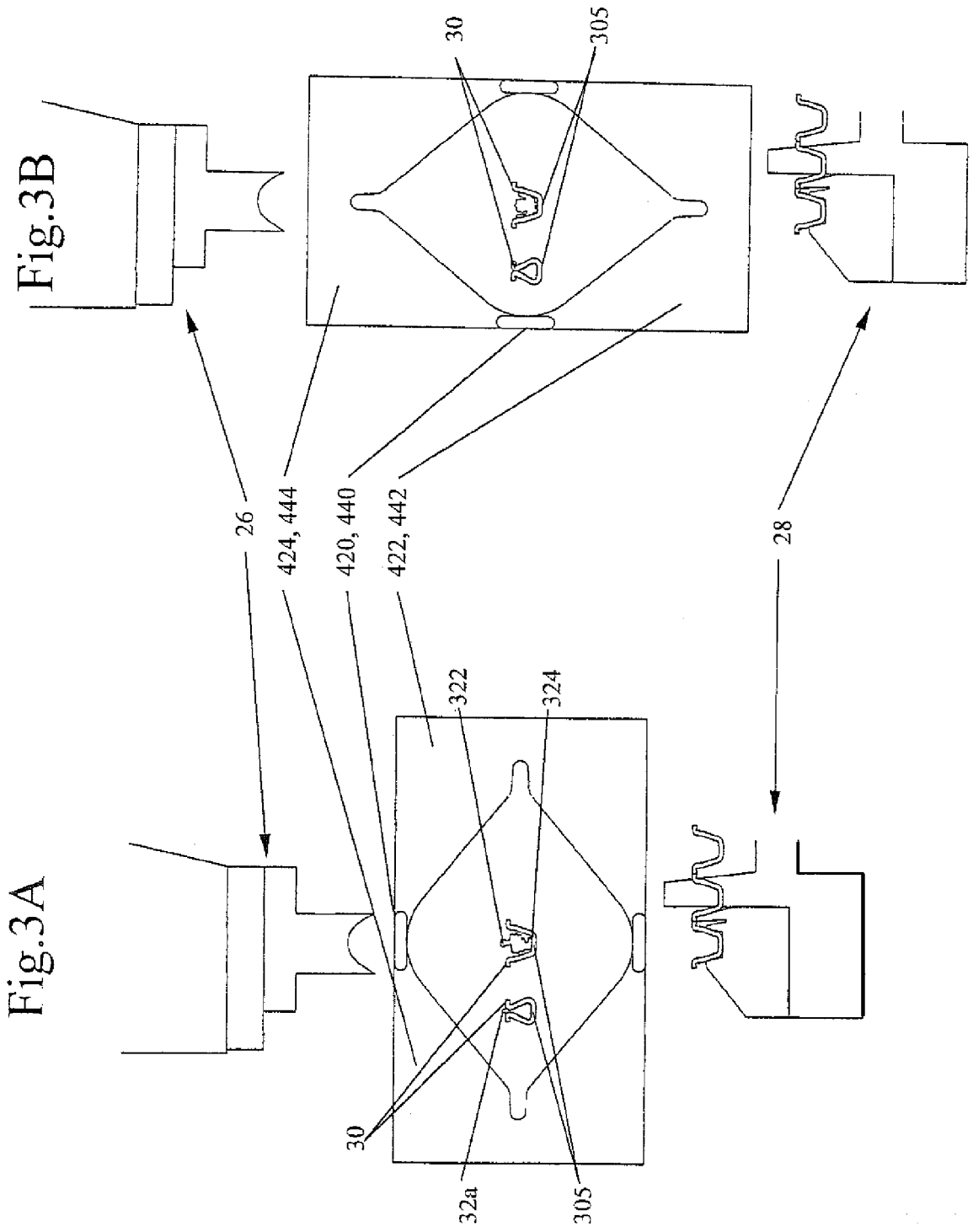

CLIP MACHINE

BACKGROUND AND SUMMARY OF THE INVENTION

The invention concerns a clip machine for the dividing and closing of tubular packaging (packaging tube) filled with a stuffing, with at least two axially spaced pairs of radially opposed displacement elements relating to the axis of the packaging tube (tube axis), which are linked and set up with a linear guide, to be compressed radially, linearly towards one another and subsequently in pairs separated axially (expanded) for the local constriction of the filled packaging and the formation of a tubular braid; with a first and then a second sealing tool, which tools are set up to set and close at least one clamp fastener (clip) around the tubing braid that had been formed between the axially separated displacement element pairs, compressed radially towards one another.

Clip machines of this type are known, for example, from DE 196 44 074 C1 (U.S. Pat. No. 6,217,436). Such clip machines are used to close tubular packaging tubes, intestines or artificial intestines—that is, sausages—filled with fluid to thick pasty or also granular (in part) contents.

First, during this process the stuffing is inserted in the packaging (filling), which then is divided into portions by means of the displacement elements (displacing). The displacement elements of each pair have facing V-shaped cutouts, with which they constrict the tubular casing by linear-radial compression and displace the stuffing located in the area being constricted in an axial direction (all directional specifications relate to the tubular axis). Through the subsequent axial separation of the two displacement element pairs an elongated tubular braid is formed to which one or two (in the case of a 'double clip allocation') closure elements are applied in the next work cycle by means of appropriate sealing tools.

The first sealing tool (die plate) and the second sealing tool (die), as they are generally known in this category of machine, are driven crosswise to the linear movement of the displacement elements. During the filling and, for the most part, also during the displacement the sealing tools are in their open position, from which they are brought into their closure position, with the clip being formed upon reaching the closure position. After the closing, the closure lever is returned with the sealing tools to their initial or open position.

In the clip machine described at the beginning, clips that are produced from an imprinted aluminum wire strand are typically processed with the clips being bent beforehand into a U-shape and are connected by means of the crosspieces on their limb ends. The strand of clips thus formed is fed along a guide track to the first sealing tool, the die plate, which discharges into the area of the assigned sealing tool.

During the transport of the strand of clips to the die plate, the foremost clip is fed, as is known, by an advancing means that engages intermittently. As long as the foremost clip is still linked to the following strand of clips it is held firmly by it in the die plate. During the closure the die plate is driven into its closure or stroke end position. In this position the foremost clip is pressed against the tubular braid and is clamped between it and the die plate.

At different times, i.e., while the die plate remains in this position, the die moves towards the die plate. Immediately before the clip is closed, the foremost clip is first separated from the following strand of clips by a shearing device provided on the sealing tool. At this moment the foremost clip is free and is pressed against the die plate by the clamping of the tubular braid. Then the clip is deformed by an additional approaching of the die to the die plate, until the sealing tool has approached to the height of the clamp and the clip has been closed around the tubular braid.

During the closure operation the crosspieces of the bent segment of the clip are pressed against the exterior of the clamp limbs and with it are bent around the braid of the packaging material, with the bent segments and crosspiece sections being pressed and compressed bluntly against one another in the process so that a ring, pressed as tight as possible around the braid of the packaging, results.

In specific cases, namely, with relatively stiff packaging material, however, failures may occur, especially when the tubular braid formed by the displacement elements, acting together in pairs, and laid in the still open clamp fastener is pulled a little apart by the displacement elements in the area of the overlap. During the subsequent closure of the clip around the tubular braid, there is a risk then of the packaging material being damaged and/or not being completely encompassed by the closed clip so that the closure is not tight.

This problem is known. For example, in EP 1 140 633 B1 (U.S. Pat. No. 6,675,554) the attempt is made to remedy it by having the tubular braid pressed axially by means of an assigned retention element next to the sealing tool at the level of the clip base before the closing so the braid can not unfurl at the opening of the unclosed clip. However, the processing of different tubular packaging materials and/or tubular cross-sections requires an adjustment of the retention element to the corresponding braid cross-section. A change of tools is not desired because of the potential risk of an incorrect manipulation.

Accordingly, the task of the present invention is to design the closure operation in a simple manner to make it more reliable process-wise.

The task is solved in a clip machine of the type mentioned at the beginning, by having the radial movement direction of the displacement element pairs essentially coincide with the movement direction of the sealing tool.

At the basis of the invention is the knowledge that a principal reason for the unfurling of the tubular braid is in the orientation of the displacement elements, interacting in pairs like shears and overlapping. Promoted by the axial movement apart of the displacement elements and the associated relative movement between the tubular braid and the displacement elements of each pair, the tubular casing material tends to penetrate the gap between the interacting displacement shears. In the process the aforementioned local unfolding or unfurling occurs. Since, in the previously known type of clip machines mentioned at the beginning, the opening/closing movement of the displacement shears, on the one hand, and the movement of the sealing tools, on the other hand, occur orthogonally to one another, the gap of the pairwise, shear-like, overlapping displacement elements was always in the direction of the movement of the sealing tool. Accordingly, the unfolding took place essentially in this direction. The expansion of the braid that had unfurled was consequently larger in the direction of the clip limbs before closing than in the direction perpendicular to it. Precisely this expansion, however, enables the clip limbs to clamp and damage a fold in the braid under the circumstances.

In contrast, the level of the greatest expansion of the braid with the arrangement of the displacement elements or their movement direction as per the invention is cross-wise to the clip limbs of the open clip so that the risk of damage to the packaging wrapping is decreased. Furthermore, the use here of a clip with shorter limbs, in particular, to close a thin braid, would be beneficial, necessitating less compression work during the closing operation, and thus the wear and tear can be reduced.

Besides the advantages mentioned, the mechanism as per the invention has, furthermore, the advantage of reduced spatial dimensions of the elements engaging in the closing because of that same movement direction.

In fact, for example, from DE 101 31 807 C1 (U.S. Pat. No. 6,871,474) a clip machine of another category is known, where the sealing tools and the displacement elements form a kinematically coupled module, which, revolvable around two crank levers, executes a synchronous movement. For that reason, here, too, the movement directions of the displacement elements and the sealing tools coincide. However, what is involved here is a clip machine of another category where, in particular, an expansion movement of the displacement elements is not planned and technically is also not possible. For that reason, no braid free-from-heating can be formed with such a clip machine, which excludes the processing of raw sausage products. Only the machines mentioned at the beginning are provided for these.

The first sealing tool is primarily fastened to an initial (lower) closure lever and mounted and driven by it so that it can pivot.

With this design the strand of clips of the die plate is fed in an advantageous manner along a guide track, which begins in the area of the pivotal axis of the closure lever. This simplifies the feed, since the pivotal axis is fixed in place.

The second sealing tool associated with a linear feed is preferred.

The second sealing tool, the die, can in fact also be fastened to a second (upper) closure lever mounted and driven by it so that it can pivot around the common pivotal axis of both closure levers. A linear back and forth movement of the die, however, improves the kinematics from the perspective of the uniform formation of the clip. This becomes noticeable during the use of different clip sizes, which, depending on the limb length of the unformed clip, causes the opening angle of the two pivotable closure levers to change at the moment of the contact of the die with the clip so that it does not engage simultaneously with both limbs. The result is that an undesired tilting or torsional moment occurs.

If, on the other hand, the movement of the second sealing tool is executed linearly, preferentially perpendicular to an intended connecting line of the limb ends of a clip laid in the first sealing tool (the die plate), the source of the error described is avoided, since the angle position of the sealing tools to one another no longer changes after the first swivel movement of the lower sealing tool.

In an advantageous further development, the clip machine demonstrates a control that is set up to drive the sealing tools, overlapping time-wise with the radial feed movement and/or the axial separation movement of the displacement element pairs, towards one another radially.

Since the facing V-shaped cutouts of the displacement elements demonstrate preferentially opening angles that are less than 90°, their opening cross-section in the movement direction is greater than perpendicular, too. Since, as per the invention, the movement direction of the sealing tools coincides with that of the displacement elements, a greater adjustment range of the sealing tools is required in order to release the opening cross-section completely. The loss in time associated with the greater adjustment range can at least be partially compensated for, on the one hand, by the temporal overlapping of the movements of the displacement elements and, on the other hand, of the sealing tools. In this movement section the sealing tools can follow maximally the total travel of the feed movement of the displacement element pairs. Timewise, the control can see to it that the sealing tools follow the displacement elements during the compression synchronously with the same speed. In principle, the entire interval of the radial feed movement and the axial separation movement of the displacement element pairs can be used for the subsequent movement.

BRIEF DESCRIPTION OF THE DRAWING FIGURES

Additional features and advantages of the invention will be explained in greater detail in the following, using an execution example with the aid of drawings.

FIG. 3A is a schematic side view of a displacement element pair in their orientation to die and die plate according to the current state-of-the-art of technology;

FIG. 3B is a schematic side view of a displacement element pair in their orientation to die and die plate during execution in terms of the invention;

DETAILED DESCRIPTION

Figure 1:
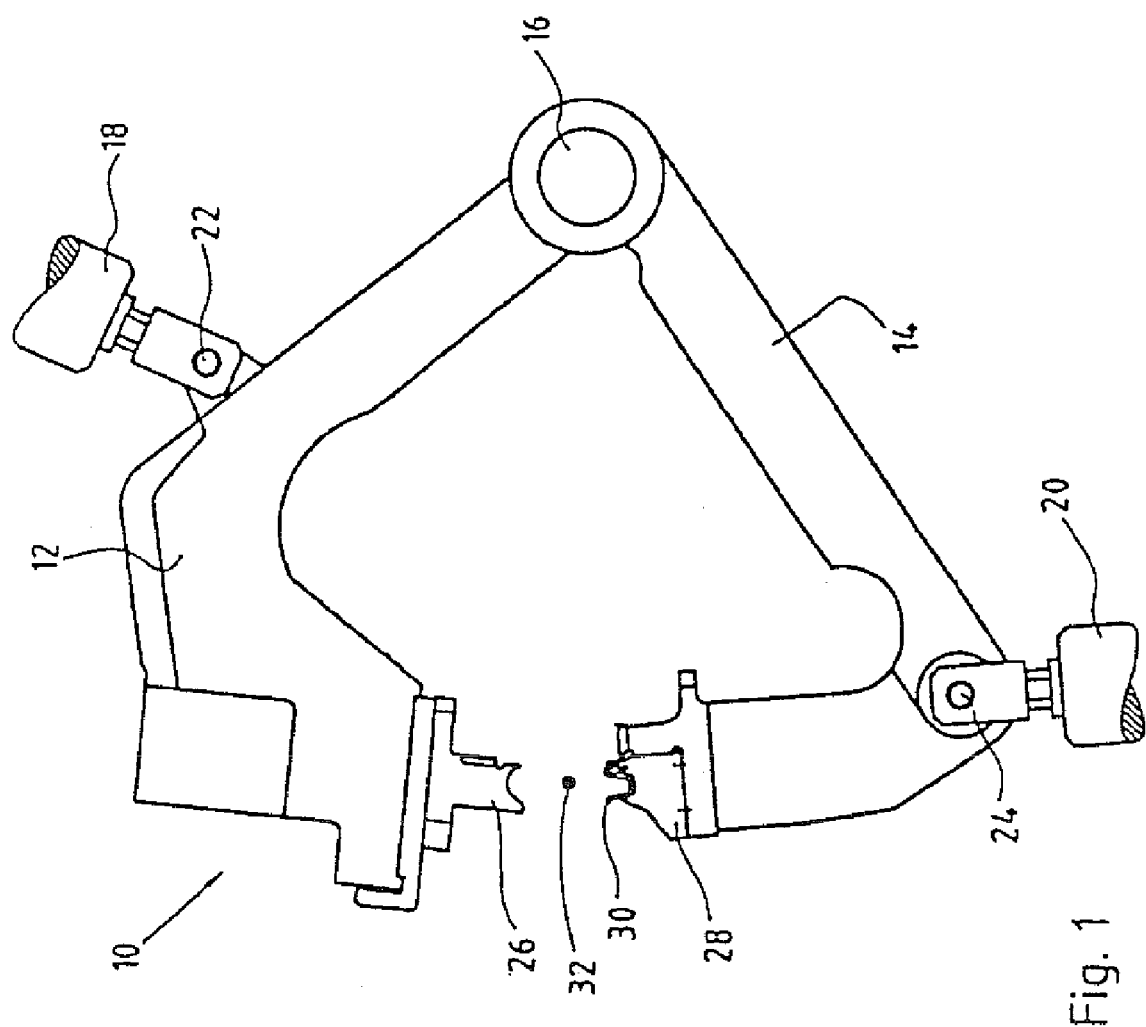
FIG. 1 is a schematically simplified side view of a closure system.

Closure system 10 of the sealing machine as per the invention has an upper, linearly conducted sealing slider 12 and a lower closure lever 14. The upper sealing slider 12 is driven by an actuator 18 whose force is initiated via articulation 22. The lower closure lever 14 is arranged pivotally around an axis 16. The pivotal movement of lower closure lever 14 is driven by a cam plate, not shown, and transferred via lifter rod 20, which engages with it at articulation 24 to closure lever 14. Die 26 is fastened to upper sealing slider 12 and die plate 28 to lower closure lever 14. An open clamp fastener 30 is held in die plate 28. Between die 26 and die plate 28 with open clamp fastener 30 there is an intestinal braid 32 to be closed, here represented in a simplified manner as a point.

Figure 4B:
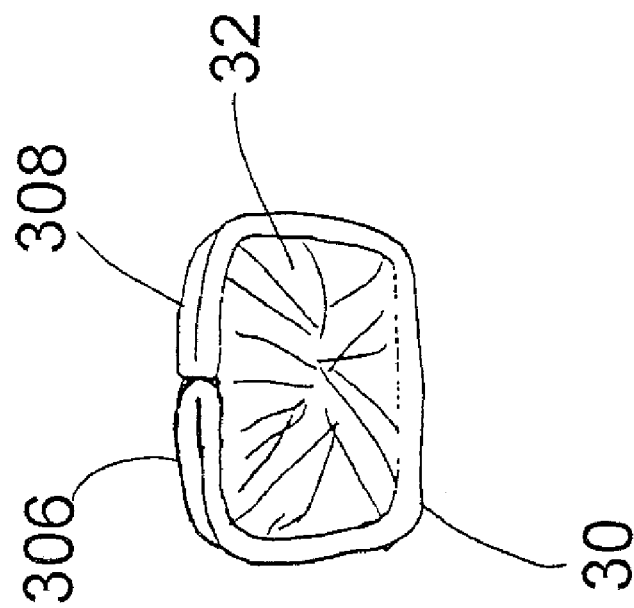
FIG. 4B shows the closure element closed around the connected braid.
Figure 4A:
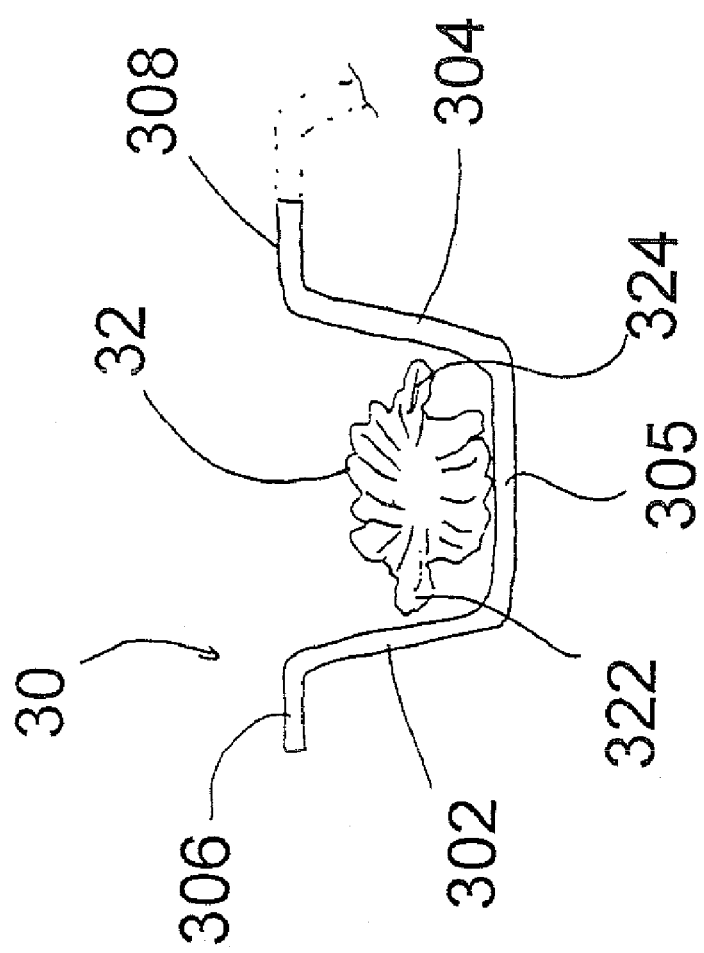
FIG. 4A shows an unclosed closure element with the tubular braid lying within in cross-section.

To close the intestinal braid, die 26 and die plate 28 are moved towards one another through a pivotal movement of closure levers 12, 14 in such a manner that first die plate 28 is driven with the inserted clamp fastener 30 against the braid 32 so that the latter comes to rest in the area between limbs 302, 304 of the clamp fastener 30 (compare FIG. 4A) and, under pressure, presses clamp fastener 30 against die plate 28. Subsequently, die 26 encounters the open limb of clamp fastener 30, and in fact first in the area of the bent limb ends 306, 308. Through an additional coming together of sealing tools 26, 28, limbs 302, 304 are bent together around intestinal braid 32, until the set clip height is attained. In the corresponding set closure interval or clamp fastener of sealing tools 26, 28 the clip or clamp fastener 30, as depicted in FIG. 4B, is plastically deformed so far that the bent limb ends 306, 308, together with limbs 302, 304 on both sides, are pressed bluntly against one another, with clamp fastener 30 thus surrounding the tubular braid 32 in the form of a ring.

After the closing of clamp fastener 30, die 26 and die plate 28 move away from one another again in order to release intestinal braid 32 closed with clamp fastener 30. In the process, closure system 10 shown makes possible a comparatively wide opening of sealing tools 26, 28 so that a sausage of a very large caliber can pass through the opening during the filling operation.

Figure 2:
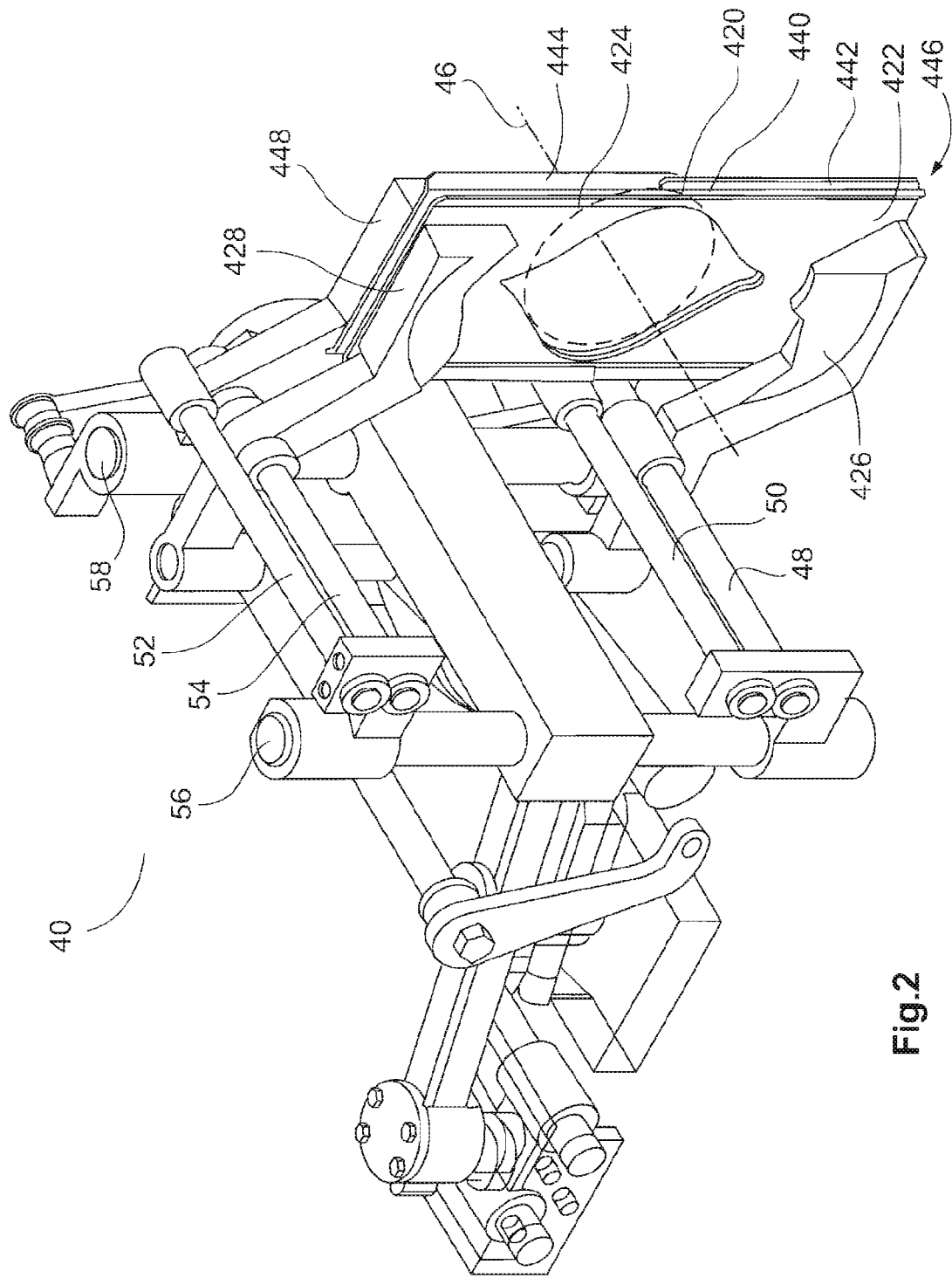
FIG. 2 is a perspective representation of two pairs of displacement elements and their drive mechanics.

Displacement system 40 depicted in FIG. 2 shows two displacement element pairs 420, 440 with two radially opposing displacement elements 422, 424 or 442, 444, each with reference to the braid or tubular axis 46. Displacement element pairs 420, 440, on the one hand, are opened in their radial position and, on the other hand, closed in their axial position with reference to tubular axis 46. This is the opening or starting position of a work cycle of displacement system 40, in which the approximate, V-shaped opening or releasing of individual displacement elements 422, 424 or 442, 444 offers a maximum aperture in cross-section for the passage of the filled packaging wrapper.

Displacement elements 422, 424 or 442, 444 come together radially for the purpose of constriction. Because of the releasing of displacement elements 422, 424 or 442, 444, shear-like, interacting and essentially in a V-shape, the aperture in cross-section is continuously narrowed until the filled, tubular-shaped packaging is constricted locally, essentially in a cross-section of the bare packaging tube material. Subsequently displacement element pairs 420, 440 are moved apart axially in the constricted state so that the stuffing is displaced in a sufficiently large axial section, and, in this way, a tubular braid 32 of the requisite length is formed.

The movements are alternatively derived from a torsional movement by means of a crank or cam plate or generated by cylinder piston arrangements operated by fluid (preferentially pneumatic) and transferred to individual displacement elements 422, 424 or 442, 444. Displacement elements 422, 424 or 442, 444 are fastened for this individually at their ends that are distal to the tubular braid to arms 426, 428 or 446, 448 (compare FIG. 2). Arms 426, 428 or 446, 448 are mounted on horizontal guide rods 48, 50, 52, 54 in a sliding manner so that a consistent horizontal movement is guaranteed. The arrangement of the horizontal guide rods 48, 50, 52, 54 for its part is mounted in a sliding manner on vertical guide rods 56, 58 in order to guarantee a defined constriction movement.

If the spread state depicted above is achieved, clip 30 is closed around tubular braid 32 in the manner described before by means of closing elements 26, 28. Displacement elements 422, 424 or 442, 444 are then separated radially, on the one hand, and compressed again axially, on the other hand. Both of these movements can be completely executed simultaneously, overlapping or sequentially. Then the opening or starting state shown in FIG. 2 is attained once again.

The state of braid 32 represented in FIG. 3A makes clear, on the one hand, the problem of the unfurling or 'formation of a pennant' portrayed in the introduction to the description, which has its source in the area of the radial overlapping of the respective, interacting displacement elements 422, 424 or 442, 444 and is promoted because of the axial expansion movement, the sliding qualities of the packaging wrapper material and displacement elements 422, 424 or 442, 444. The sideways expansions 322, 324 of the furled tubular braid 32 (see also FIG. 4A) are formed through this, which has the effect that, under the circumstances, the clip limbs during bending could constrict and damage a fold 32a of braid 32. Because of the arrangement of the displacement element pairs 420, 440 as per the invention, as depicted in FIG. 3B, these expansions 322, 324, however, are essentially at the level of the ridge of the staple 305 so that they are not clamped by limb ends 306, 308 during the closure of clamp fastener 30.

Having described the invention, what is claimed is:

1. Clip machine for dividing and sealing tubular-shaped packaging filled with stuffing comprising:
at least two axially spaced pairs of radially opposed displacement elements, relating to the axis of the packaging tube, which are operatively attached to a first linear guide, the first linear guide extending radially relative to the axis of the packaging tube, to be compressed radially towards one another and then separated axially in pairs, for the local constriction of the filled packaging and the formation of a tubular braid radially-linearly;
a pivotably arranged first sealing tool and a second sealing tool, with the first and second sealing tools being equipped to set and close at least one clamp fastener around the formed tubular braid, to be compressed radially between the axially separated displacement element pairs, the radial movement direction of displacement element pairs coincides essentially with the radial movement direction of sealing tools.

2. Clip machine according to claim 1, where the first sealing tool is fastened to a first lower closure lever and is mounted and driven pivotably by it.

3. Clip machine according to claim 2, where the second sealing tool is linked to a second linear guide.

4. Clip machine according to claim 1, further comprising:
a controller for compressing the sealing tools to overlapping timewise with the radial compression movement and/or the axial separation movement of the displacement element pairs.

5. A method for dividing and sealing tubular-shaped packaging filled with stuffing comprising the steps of:
providing a packaging tube filled with stuffing;
providing at least two axially spaced pairs of radially opposed displacement elements relating to the axis of the packaging tube,
moving the displacement element pairs radially towards one another and then moving the displacement element pairs axially away from one another forming a localized constriction of the filled packaging and a radially-linearly tubular braid;
providing a pivotably arranged first sealing tool and a second sealing tool, with the first and second sealing tools being equipped to set and close at least one clamp fastener around the formed tubular braid;
moving the sealing tools radially towards one another closing the at least one clamp fastener about the formed tubular braid,
the step of radially moving the displacement element pairs coinciding with the step of radially moving the sealing tools.

6. The method of claim 5 where the step of providing the pairs of displacement elements comprises providing pairs of displacement elements operatively attached to a first linear guide, the first linear guide extending radially relative to the axis of the packaging tube.

7. The method of claim 5 where the step of providing a first sealing tool comprises providing a first sealing tool fastened to a first lower closure lever and is mounted and driven pivotably by it.

8. The method of claim 7 where the step of providing a second sealing tool comprises providing a second sealing tool linked to a second linear guide.

9. A method for dividing and sealing tubular-shaped packaging filled with stuffing comprising the steps of:
providing a packaging tube filled with stuffing;
providing at least two axially spaced pairs of radially opposed displacement elements relating to the axis of the packaging tube,
moving the displacement element pairs radially towards one another and then moving the displacement element pairs axially away from one another forming a localized constriction of the filled packaging and a radially-linearly tubular braid;

providing a pivotably arranged first sealing tool and a second sealing tool, with the first and second sealing tools being equipped to set and close at least one clamp fastener around the formed tubular braid;

moving the sealing tools radially towards one another closing the at least one clamp fastener about the formed tubular braid, the step of radially moving the displacement element pairs coinciding with the step of radially moving the sealing tools, the step of radially moving the displacement element pairs comprises moving the displacement element pairs essentially in the same radial direction that the step of moving radially moving the sealing tools moves the sealing tools.

\* \* \* \* \*